United States Patent
Soderberg et al.

(10) Patent No.: US 6,363,386 B1
(45) Date of Patent: Mar. 26, 2002

(54) SYSTEM AND METHOD FOR MANAGING PROPERTY INFORMATION RELATED TO A RESOURCE

(75) Inventors: Joel M. Soderberg, Redmond; Van C. Van, Kirkland; Brian J. Deen, North Bend; Michael J. Hillberg, Kirkland; Chao-Chia Liu, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,538

(22) Filed: Jul. 26, 1999

(51) Int. Cl.[7] .............................................. G06F 17/30
(52) U.S. Cl. ...................... 707/10; 707/513; 707/501.1; 345/733; 345/751; 345/760
(58) Field of Search ............................... 707/1, 10, 501, 707/513, 501.1; 709/217–219; 345/326, 329, 330, 331, 733, 751, 760

(56) References Cited

U.S. PATENT DOCUMENTS 6,240,429 B1 * 5/2001 Thronton et al. ........... 707/500

OTHER PUBLICATIONS

"Collaborative Authoring on the Web: Introducing Web-DAV" by E. James Whitehead, Jr., Bulletin of the American Society of Information Science, pp. 25–29, Oct. 1998.*

"WEBDAV: IETF Standard for Collaborative Authoring on the Web," Whiethead et al., IEEE Internet Computing, Sep.–Oct. 1998, pp. 34–40.*

* cited by examiner

Primary Examiner—Hosain T. Alam
(74) Attorney, Agent, or Firm—Workman, Nydegger, Seeley

(57) ABSTRACT

A method is described for managing property information related to a resource such as a computer file or directory. First, a property file is created for storing property information related to the resource. Next, the property file is directly associated with the resource such that if the resource is moved, copied, or deleted, the corresponding property file is also moved, copied, or deleted, thus protecting against disassociation. The property file is also directly associated with the resource without having to refer to a separate look-up or sequel database, thus saving computer time. Organizing the property file in this manner allows for searches to be performed on the property information as well as on the content of the resource.

22 Claims, 6 Drawing Sheets

SYSTEM AND METHOD FOR MANAGING PROPERTY INFORMATION RELATED TO A RESOURCE

BACKGROUND OF THE INVENTION

1. The Field of the Invention

The present invention relates to file management. Specifically, the present invention relates to a system and method for managing property information related to a resource, such as a file maintained in a file system.

2. The Prior State of the Art

A computer file is a collection of bytes stored as an individual entity and having an assigned file name that is unique within a directory. There are many types of files including executable files, graphics files, audio files, document files, spreadsheet files, and so forth.

Often, it is desirable to keep a record of properties associated with the file. For example, for document files, it might be useful to keep track of the title, the author, the reviewer, the number of characters, the total editing time, the security parameters, the creation time, the last-modified time, the file size, and so forth. For executable files, it might be also be useful to keep track of the executable name, the last compilation date, the number of lines of code used to create the executable, and so forth.

There are several ways to store these properties and associate the properties with the primary file that they describe. One method (called herein the "internal inclusion method") stores the property information within the primary file itself. For example, in Microsoft® Word documents, property information concerning the Word document such as the author is stored as part of the Word document itself. This property information is not viewed when the Word document is opened using Microsoft® Word because Microsoft® Word refrains from displaying such information.

In this internal inclusion method, the property information is moved, copied, or deleted along with the rest of the primary file. Since the property information is located directly within the primary file, there is substantially no risk of the property information becoming disassociated with the primary file as long as the primary file itself does not become corrupted.

A disadvantage of the internal inclusion method is that the properties cannot be changed without changing the primary file itself. Thus, after changing the property, the entire primary file is saved. This save transaction can take significant time in computer terms for larger primary files.

In another method (called herein the "indirect association method"), the property information is not stored within the primary file, but in a separate property file. This method is "indirect" in that the property file is obtained by reference to a separate table. In this indirect association method, the properties are set by editing and saving smaller property files rather than the much larger primary files.

A disadvantage of the indirect association method is that each time the property information is referenced, the separate table must be read. Furthermore, when the primary file is moved, copied, or deleted, appropriate amendments in the separate table must reflect these changes. This reading and amending of the separate table can also take significant time and occupy valuable computer resources.

Another disadvantage of the indirect association method is that when a search is performed of the primary file, the property file is not also automatically searched. Thus, it is difficult to search for which primary files are authored by a certain person since the field describing the author is contained within the unsearched property file, and not in the primary file.

Thus, a system and method are desired for associating property information with the primary file without having the property information included in the primary file, and without have the property information associated with the primary file only indirectly by reference to a separate table. Furthermore, a system and method are desired for searching a property file along with its primary file.

SUMMARY OF THE INVENTION

The present invention relates to the management of property information related to a resource, the resource being, for example, a file or directory. For example, it may be desirable to keep track of the author, reviewer, creation date, size, and so forth of a document.

In the present invention, a property file is created for storing property information related to the resource. The property file exists as a separate entity from the resource. Thus, changing the resource is not necessary in order to set or delete properties related to the resource. This is particularly important for larger resources such as large text files which require significant time and resources in computer terms to save a new version of the text file after alteration.

Furthermore, the property file is directly associated with the resource such that if the resource is moved, copied, or deleted, the corresponding property file is also moved, copied, or deleted, respectively. Thus, the chance of the property file becoming disassociated with the resource is relatively small. Disassociation is undesirable since property information that relates to a resource that cannot be located is substantially useless. Furthermore, as changes occur to the resource, the property information in the disassociated property file cannot be updated and thus the property information quickly becomes outdated. Still, even though the property file is disassociated and thus useless, the property file still occupies memory that could be more efficiently used for other purposes.

Also, the property file is directly associated with the resource without having to refer to a separate look-up or SQL database, which can take considerable time.

Searches may also be performed by setting criteria for property information in the property files, as well as by setting criteria for content information in the resource. For example, a search may be performed for all documents containing the word "patent" and that are authored by "John Doe". Thus, much more refined searches may be performed since property information is considered in the search.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to systems and methods for managing property information related to a primary file. The property information is not stored within the primary file itself allowing the property information to be edited without editing the entire primary file. Furthermore, even though the property information is stored in a separate property file, the property information is moved, copied, and deleted along with the primary file and without reference to a separate table.

Embodiments within the scope of the present invention include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
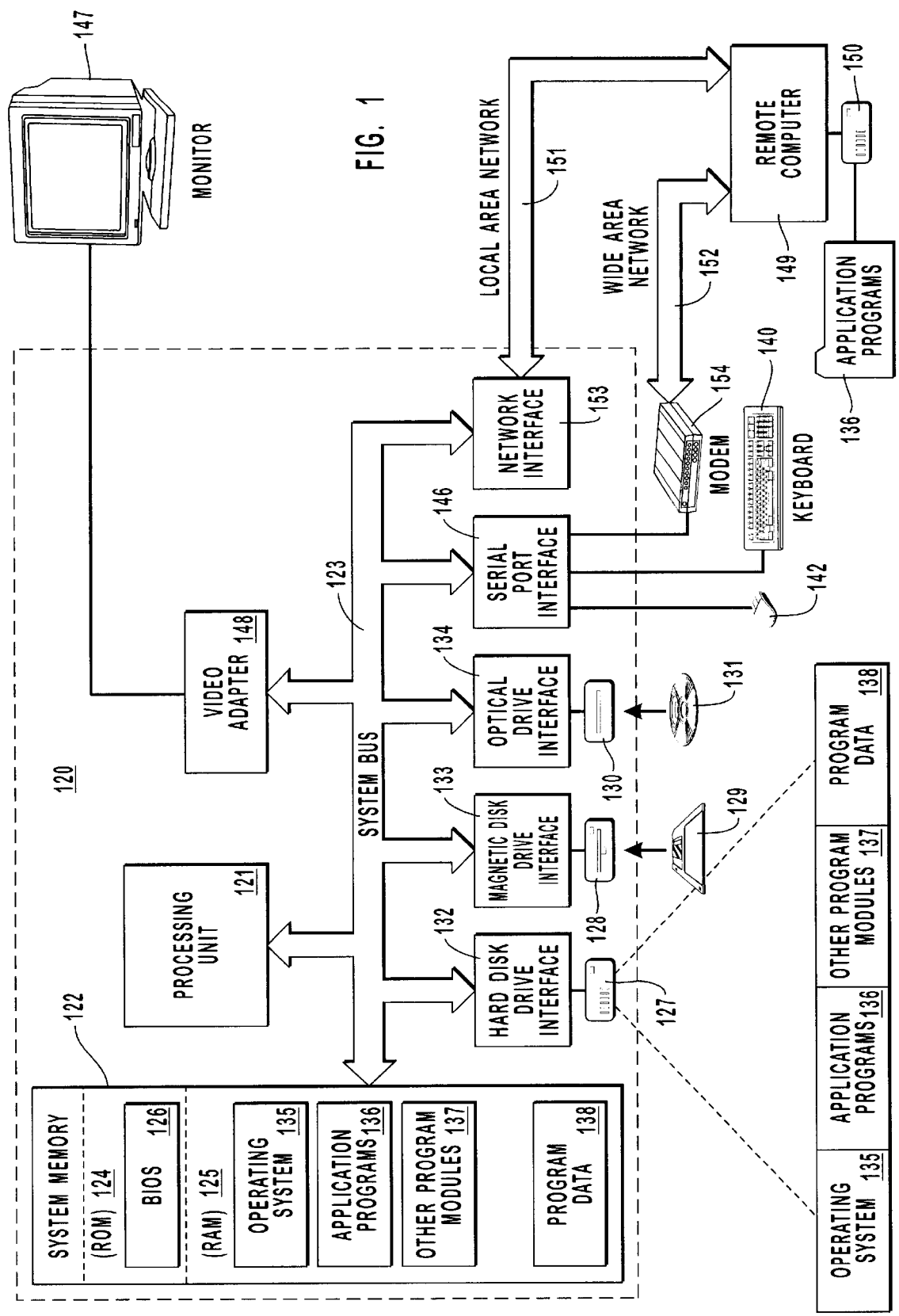
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk, not shown, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk, a removable magnetic disk 129 and a removable optical disk 131, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to the computer 120, although only a memory storage device 150 has been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing a communications link between the computers may be used.

Figure 2:
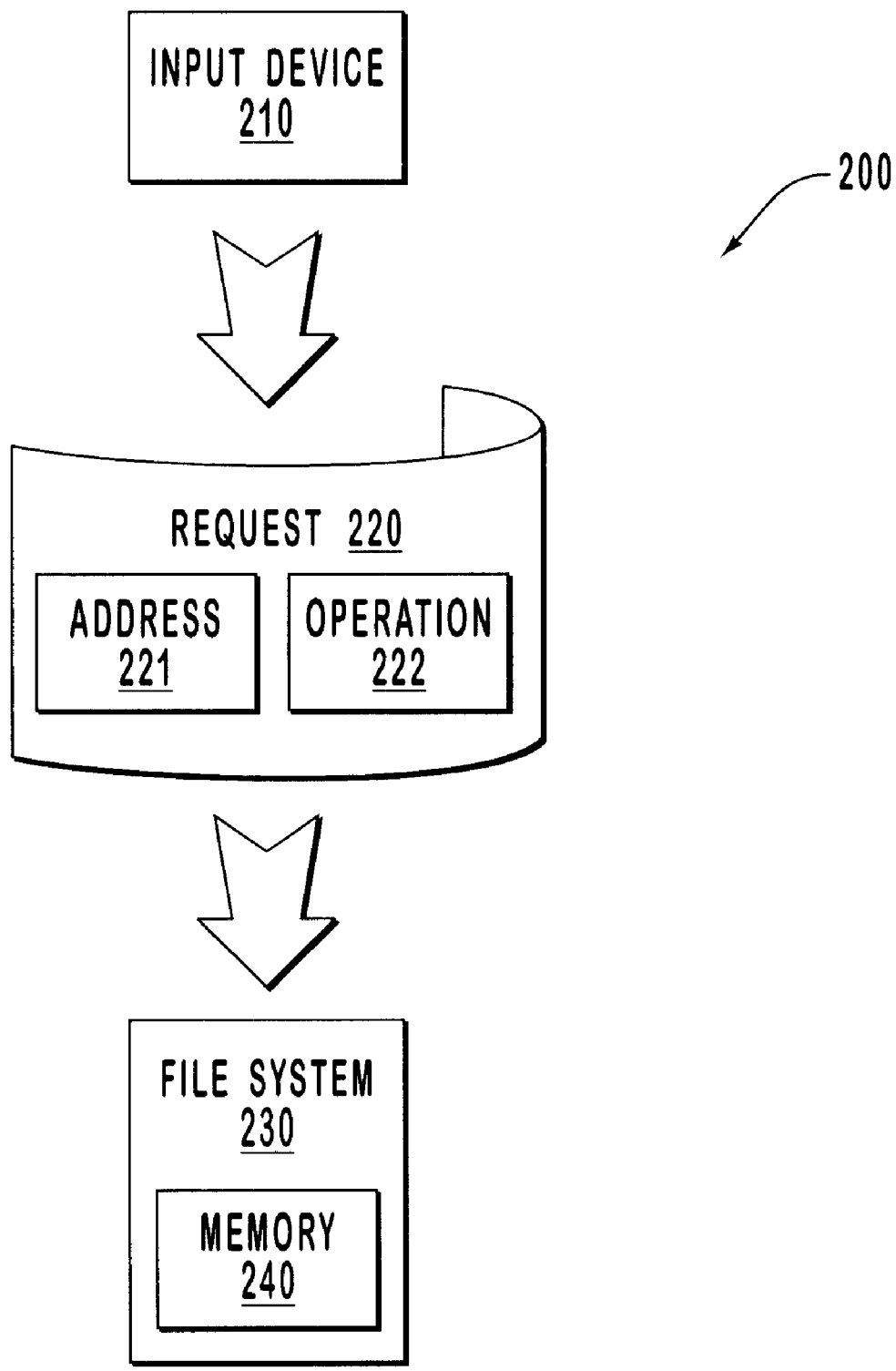
FIG. 2 is a schematic diagram of a system in which the invention can be implemented.

FIG. 2 is a schematic diagram of a system 200 in which the invention can be implemented. In a typical file system operation, an input device 210 generates a request 220 including an address 221 and an operation 222. The address 221 identifies a location of a resource within a memory 240 accessible by a file system 230, and the operation 222 defines the action that is to be imposed upon the resource. In this description and in the claims, a "resource" includes a computer file as well as a directory in which a collection of computer files can be stored. The file system 230 receives, interprets, and processes the request 220.

In one embodiment, the entire system 200 of FIG. 2 is within a single computer such as computer 120 of FIG. 1. In this case, the input device 210 may be the operating system 135, application programs 136, other program modules 137, keyboard 140, mouse 142, or a combination of these. The request 220 would be transmitted from the input device over the system bus 123 to the operating system 135 or one of the application programs 136 which may act as the file system 230.

Figure 3:
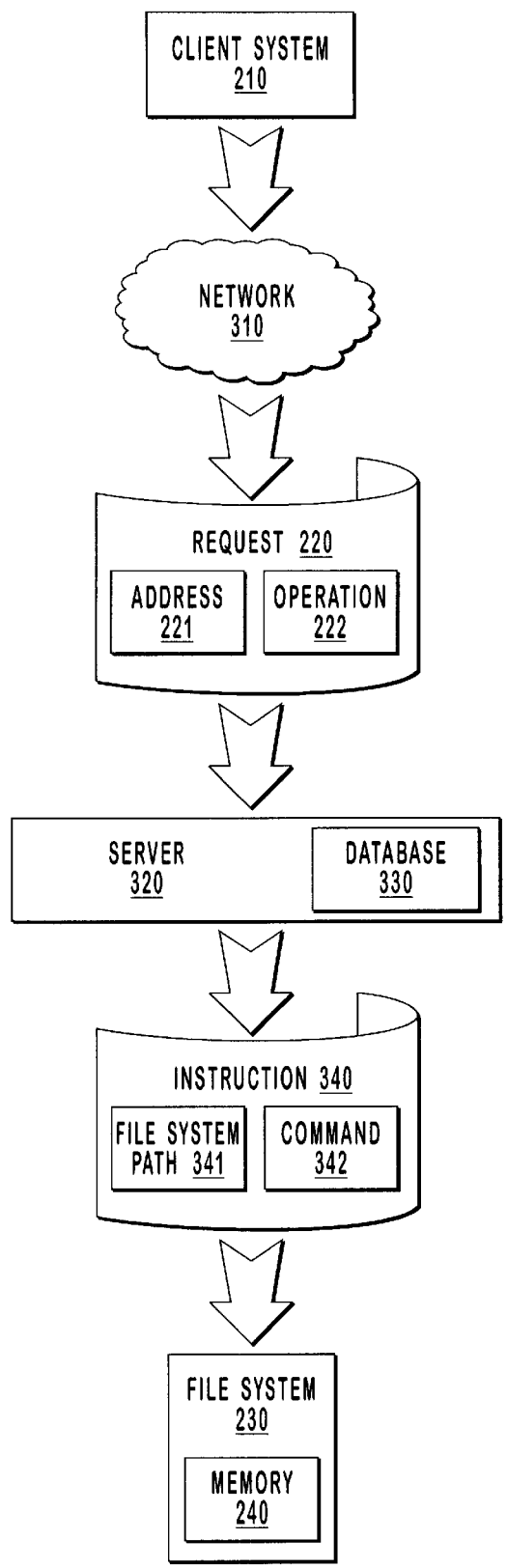
FIG. 3 is a schematic diagram of a server system in which the invention can be implemented.

In another embodiment of system 200 shown in FIG. 3, the system 200 is distributed over a network 310. Specifically, the input device 210 may be a client system 210 such as the computer 120 of FIG. 1. The client system 210 generates the request 220 and transmits the request 220 over the network 310 to a server 320. The network 310 may be the local area network 151 or the wide area network 152 (e.g., the Internet) of FIG. 1, and the server 320 may be the remote computer 149 of FIG. 1. In response to the request 220, the server 320 issues an instruction 340 to the file system 230. The instruction includes a file system path 341 corresponding to the address 221 in the original request 220. The instruction also includes a command 342 reflecting the operation 222 in the original request 220. The instruction 340 may be identical to the request 220 if the request 220 is in a format recognized by the file system 230. However, the server 320 may use database 330 to form the instruction 340 from the request 220 should the request 220 be in a format not recognized by the file system 230. The system 200 of FIG. 2 and FIG. 3 may be used to create a property file and associate the property file with the primary resource as shown in FIG. 4.

Figure 4:
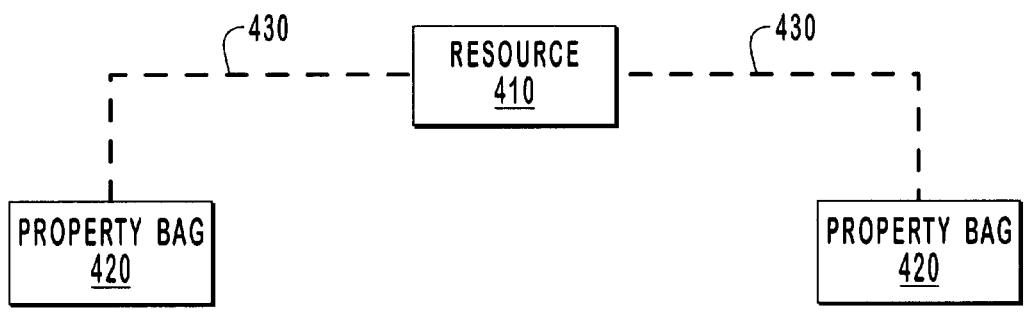
FIG. 4 is schematic diagram of property bags in direct association with the primary resource file.

FIG. 4 illustrates a primary resource 410 addressed by the address 221 of FIGS. 2 and 3, and by the file system path 341 of FIG. 3. The primary resource includes a number of property files, also known as property bags 420, containing property data related to the primary resource 410. For example, one of the property bags 420 may contain an author and title of the primary resource 410. The primary resource 410 and property bags 420 are stored in the memory 240 of the file system 230 of FIG. 2.

The property bags 420 are directly associated with the primary resource 410 as represented by association links 430. In this description and in the claims, two "directly associated" resources means that when one resource is copied, moved, or deleted, the other resource is likewise automatically copied, moved, or deleted without reference to a separate database or table. The property bag 420 may be directly associated with the primary resource 410 by calling an Object Linking and Embedding ("OLE") 32 Application Program Interface (API). These OLE 32 API's may be represented in FIG. 1 by one of the application programs 136 or the other program modules 137. OLE is a compound document standard developed by Microsoft Corporation of Redmond, Wash. General features and operation of OLE are widely understood by those skilled in the art. OLE is further described in "Inside OLE 2" by Kraig Brockschmidt, published by Microsoft Press, which is incorporated herein by reference.

Figure 5:
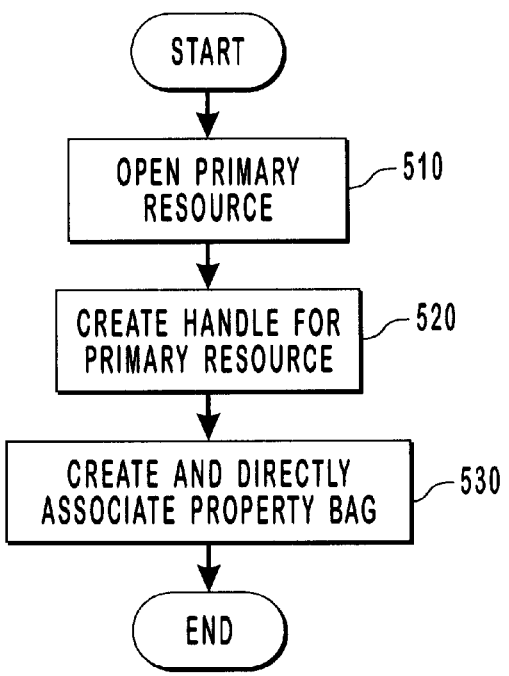
FIG. 5 is a flowchart showing a method for directly associating the property bags with the primary resource file.

FIG. 5 is a flowchart illustrating a method for directly associating the property bag 420 with the primary resource 410. Specifically, the primary resource 410 is opened (step 510) and a handle is defined from the primary resource 410 (step 520). These steps may be accomplished by calling an OLE 32 interface using the following text string:

hfile ->createfile (file path, read/write, exclusive)

This text stream results in the term "hfile" being used as the handle for the primary resource 410 defined by the "file path." In this description and in the claims, a "handle" is a temporary name used to identify a resource. The function "createfile" indicates that the primary resource 410 is to be opened, not created as the function name implies. The field "file path" identifies the primary resource 410 and might include the entire file system path 341, portions of the file system path 341, or just the name of the primary resource 410. The fields "read/write" and "exclusive" indicate the access control parameters of the opened file.

The property bag 420 is then created and directly associated with the primary resource 410 (step 530). This may be accomplished by passing in the handle for the primary resource 410 to a function. For example, the following function may be used to create and directly associate the property bag 420.

StgCreateStorageOnHandle(IN HANDLE hFile,

OUT void **ppObjectOpen);

Here, the name "hfile" represents the primary resource 410 handle which is passed into the function "StgCreateStorageOnHandle". The property bag 420 name (e.g., "ppObjectOpen") is passed out as an output to this function. Once the property bag 420 is created and directly associated with the primary file 410, the properties within the property bag 420 may be set and searched as described herein.

The property bag 420 may be created in the context of a Windows NT® File System (NTFS). NTFS allows resources contained therein to include a main file stream and secondary file streams. The primary resource 410 may be stored within the main file stream while the property bag 420 is stored in the secondary file stream. Once the property bag 420 is created and directly associated with the primary file 410, the properties within the property bag 420 may be set and searched as described herein.

Figure 6:
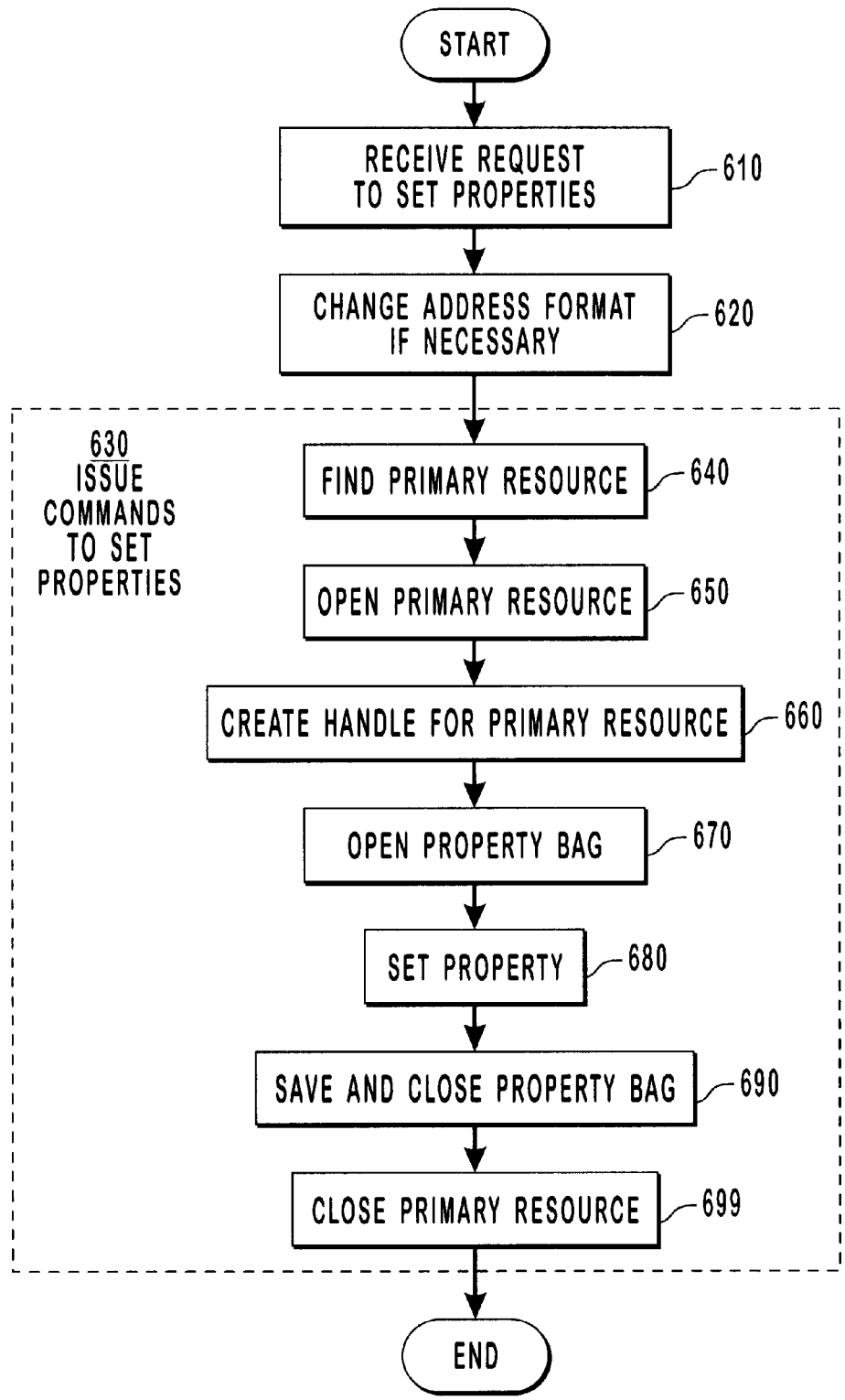
FIG. 6 is a flowchart of a method for setting properties within the property bag of FIG. 3.

FIG. 6 is a flowchart of a method for setting properties within the property bag 420 of FIG. 4. The method is initiated when the request 220 is received (step 610), for example, at the file system 230 of FIG. 2, or at the server 320 of FIG. 3. The request 220 may be made compliant with an extension of HyperText Transfer Protocol called Distributed Authoring and Versioning ("DAV" or "WebDAV"). For example, in WebDAV, the operation 222 of the request might be "PROPPATCH" which sets or deletes properties related to resource. In this case, the address 221 of the request 220 is a uniform resource locator (URL) identifying the primary resource 410.

After the request 220 is received (step 610), the format of the address 221 is changed, if necessary, (step 620) to be recognized by the file system 230. In FIG. 3, this format change is represented by address 221 changing to file system path 341. Alternatively, this format change might also occur internal to the file system 230 itself. In an Internet environment, the address 221 may be, for example, a uniform resource locator.

Next, commands are issued to cause the property to be set (step 630). For example, the command 342 of FIG. 3 might be generated by the server 320 in response to interpreting the operation 222 of the original request 220. The commands may call for certain application program interfaces (APIs) that are provided by OLE 32, a software service available from Microsoft Corporation and compatible with Windows® 95, Windows® 98, and Windows NT®.

As an example, the issuance of these commands (step 630) may include finding the primary resource 410 (step 640), and opening the primary resource 410 (step 650). Next, a handle is defined for the primary resource 410 (step 660) in order to control access to the primary resource 410 and property bags 420 while the properties are being set.

Finding the primary resource 410 (step 640) from the file system path 341 is a basic function of many, if not all, conventional file systems. The opening of the primary resource 410 (step 650) and the defining of the handle for the primary resource 410 (step 660) may be accomplished the same as in steps 510 and 520 of the method of directly associating the property bag 420 with the primary resource 410. Specifically, the following OLE 32 interface may be used:

hfile ->createfile (file path, read/write, exclusive)

Next, the handle is used to open the property bag 420 associated with the primary resource 410 (step 670). For example, an OLE 32 interface named "pBag" may be called to open the property bag 420 using the following method call represented here in source code.

pBag ->get propertybag(hfile)

The handle "hfile" is passed into the method "get propertybag" of the interface "pBag."

After the property bag 420 is opened (step 670), the properties are set (step 680). For example, to set an author to be John Doe, and a reviewer to be Mary Moe, a "set" method of the "pBag" interface is used as follows:

pBag ->set("author", "John Doe")
   pBag ->set("reviewer", "Mary Moe")

Note that the interface "pBag" also has a method named "delete" whereby properties may be deleted from the property bag 420.

Once the properties are set (step 680), the property bag is saved and closed (step 690). For example, a "save" method of the "pBag" interface is implemented as follows:

pBag ->save

Finally, the primary resource is also closed (step 699). Thus, the properties within the property bags 420 may be set.

Figure 7:
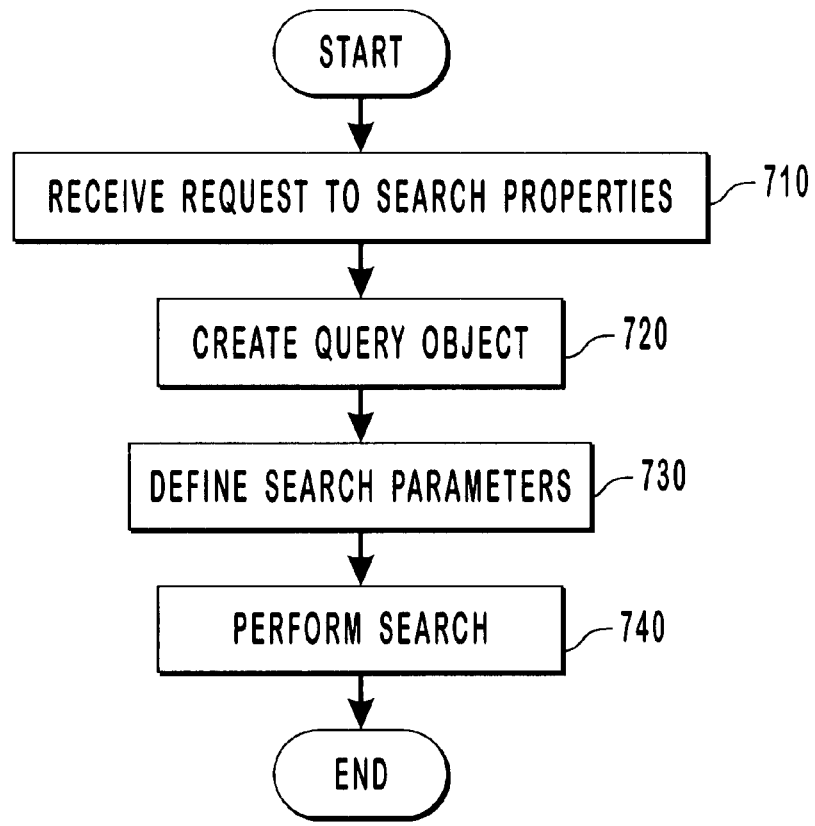
FIG. 7 is a flowchart of a method for searching properties within the property bag of FIG. 3.

The properties within the property bags may also be searched as shown in the flowchart of FIG. 7. The method is initiated by the receipt of a request 220 (step 710) to search the property bag 420. For example, this request may be received at the file system 230 of FIG. 2, or at the server 320 of FIG. 3. The request 220 may be made compliant with an extension of HyperText Transfer Protocol called Distributed Authoring and Versioning ("DAV" or "WebDAV"). For example, in WebDAV, the operation 222 of the request might be "SEARCH" which searches documents identified by a uniform resource locator (URL).

In response to this request 220, a query object is created (step 720). For example, a query object related to Monarch SQL may be created by calling an OLE 32 interface called "PQuery" and using a method called "CoCreate" using the following method call:

PQuery=CoCreate(Monarch Query Object)

Also in response to the request, the search parameters are defined (step 730). For example, suppose that the authors and reviewers are desired for all documents that John Doe has authored and which contain the word "patent." The Monarch SQL query language may be as follows:

Select "Author", "Reviewer"
   From Scope ([Insert file system path])
   Where Contain ("Patent")
      Contain ("Author", John Doe)

The actual parameters may be defined for the search by using the "PQuery" interface of OLE 32. Specifically, the following method call may be used:

PQuery =(Sit Text "[insert the above quoted Monarch Query Language]")

The term is the quotation marks indicates that the term should be replaced with the above quoted Monarch query language (namely, from "SELECT" to "John Doe)").

As a final step, the search is then performed (step 740). For example, the method "execute" of the OLE 32 interface "PQuery" may be performed in response to the following method call.

PQuery =Execute

In response, the interface "PQuery" will return all resource and corresponding paths within the scope of the search that positively match the search parameters.

In this manner, the property bags 420 may be created, the properties may be set, and the properties may be searched.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system that includes a memory system and one or more primary resources that may be stored in the memory system, a method of managing properties associated with the one or more primary resources, the method comprising:

an act of creating a property file for storing at least one property associated with a primary resource;

an act of directly associating the property file with the primary resource such that when the primary resource is moved, copied, or deleted, the property file is likewise also automatically moved, copied, or deleted, respectively, without reference to a separate database or table;

an act of receiving a request to set one or more properties within the property file associated with the primary resource in accordance with a distributed authoring protocol;

an act of finding the property file associated with the primary resource in response to the request;

an act of opening the property file associated with the primary resource;

an act of setting a property within the property file; and an act of closing the property file associated with the primary resource.

2. The method according to claim 1 wherein the act of receiving a request comprises:

an act of receiving the request using an extension of HyperText Transfer Protocol (HTTP).

3. The method according to claim 1, wherein the act of receiving a request comprises:

an act of receiving the request using WebDAV protocol.

4. The method according to claim 1, wherein the act of finding the property file comprises:

an act of finding the primary resource; and an act of opening the primary resource.

5. The method according to claim 1, further comprising:

after the act of closing the property file, an act of closing the primary resource.

6. The method according to claim 1, wherein the act of opening the property file comprises:

an act of creating a handle for the primary resource; and an act of using the handle to open the property file.

7. The method according to claim 1, wherein the act of receiving a request comprises:

an act of receiving a request including an address and an operation.

8. The method according to claim 1, further comprising:

an act of changing a format of the address included in the request.

9. The method according to claim 1, wherein the act of receiving a request comprises:

an act of receiving a request including a uniform resource locator at a server; and an act of converting the uniform resource locator into a file system path recognized by a file system, the file system being associated with the memory system upon which the primary resource and the property file reside.

10. The method according to claim 9, wherein the primary resource comprises a file.

11. The method according to claim 3, wherein the primary resource comprises a directory.

12. The method according to claim 1, wherein the act of creating a property file is accomplished using an OLE 32 application program interface.

13. The method according to claim 1, wherein the act of directly associating the property file with the primary resource is accomplished using an OLE 32 application program interface.

14. The method according to claim 1, further comprising:

an act of searching the at least one property in the property file.

15. The method according to claim 1 further comprising:

before the act of searching, an act of receiving a request to search the at least one property within the property file.

16. The method according to claim 1, wherein the act of receiving a request comprises:

an act of receiving the request using an extension of HyperText Transfer Protocol (HTTP).

17. The method according to claim 1, wherein the act of receiving a request comprises:

an act of receiving the request using WebDAV protocol.

18. The method according to claim 17, further comprising:

before the act of searching, an act of defining search parameters.

19. The method according to claim 17, further comprising:

before the act of searching, an act of creating a search query object.

20. A computer program product for use in a computer system that includes a memory system and one or more primary resources that may be stored in the memory system, the computer program product comprising one or more computer-readable media having computer-executable instructions stored thereon, the computer-executable instruction for performing the following acts:

creating a property file for storing at least one property associated with a primary resource;

directly associating the property file with the primary resource such that when the primary resource is moved, copied, or deleted, the property file is likewise also moved, copied, or deleted, respectively, without reference to a separate database or table;

detecting the receipt of a request to set one or more properties within the property file associated with the primary resource in accordance with a distributed authoring protocol;

finding the property file associated with the primary resource in response to the request;

opening the property file associated with the primary resource;

setting a property within the property file; and closing the property file associated with the primary resource.

21. The computer program product of claim 20, wherein the one or more computer-readable media further have stored thereon computer-executable instructions for performing the following act:

searching the at least one property in the property file.

22. The computer program product of claim 21, wherein the one or more computer-readable media further have stored thereon computer-executable instructions for performing the following act:

detecting the receipt of a request to search the at least one property within the property file before searching.

* * * * *